United States Patent [19]
Späth

[11] Patent Number: 6,091,694
[45] Date of Patent: Jul. 18, 2000

[54] SOLID IMMERSION LENS WITH SEMICONDUCTOR MATERIAL TO ACHIEVE HIGH REFRACTIVE INDEX

[75] Inventor: Werner Späth, Holzkirchen, Germany

[73] Assignee: Siemens Aktiengesellschaft, Munich, Germany

[21] Appl. No.: 09/149,814

[22] Filed: Sep. 8, 1998

[30] Foreign Application Priority Data

Sep. 5, 1997 [DE] Germany .................... 197 38 985

[51] Int. Cl.[7] .................................................. G11B 7/125
[52] U.S. Cl. ................. 369/112; 369/44.14; 369/44.23; 369/13; 359/664
[58] Field of Search .................. 369/112, 99, 44.23, 369/44.14, 119, 13; 359/819, 664; 257/88, 98, 99

[56] References Cited

U.S. PATENT DOCUMENTS

| | | | |
|---|---|---|---|
| 5,121,256 | 6/1992 | Corle et al. ............................. | 359/664 |
| 5,125,750 | 6/1992 | Corle et al. ............................. | 359/819 |
| 5,497,359 | 3/1996 | Mamin et al. ......................... | 369/44.15 |
| 5,729,393 | 3/1998 | Lee et al. ................................ | 359/819 |
| 5,764,613 | 6/1998 | Yamamoto et al. ..................... | 369/112 |
| 5,808,323 | 9/1998 | Spaeth et al. ........................... | 359/625 |
| 5,881,042 | 3/1999 | Knight .................................... | 369/112 |
| 5,883,872 | 3/1999 | Kino ....................................... | 369/112 |

FOREIGN PATENT DOCUMENTS

| | | |
|---|---|---|
| 1 491 064 | 11/1977 | United Kingdom . |
| 2 181 567 | 4/1987 | United Kingdom . |

*Primary Examiner*—Tan Dinh
*Assistant Examiner*—Kim-Kwok Chu
*Attorney, Agent, or Firm*—Herbert L. Lerner; Laurence A. Greenberg; Werner H. Stemer

[57] ABSTRACT

An immersion system for a magneto-optical storage device has a spherical-segment-shaped lens. The lens is formed of material that is transparent to the electromagnetic radiation of the wavelength $\lambda$ at which the device is operated, and preferably of a semiconductor material. The lens has a first refractive index $n_1$ which is greater than that of air. A layer with a higher refractive index than the lens is disposed in the propagation path of the electromagnetic radiation. The layer is composed of a material with a second refractive index $n_2$ that is greater than the first refractive index $n_1$ of the material of the lens.

10 Claims, 2 Drawing Sheets

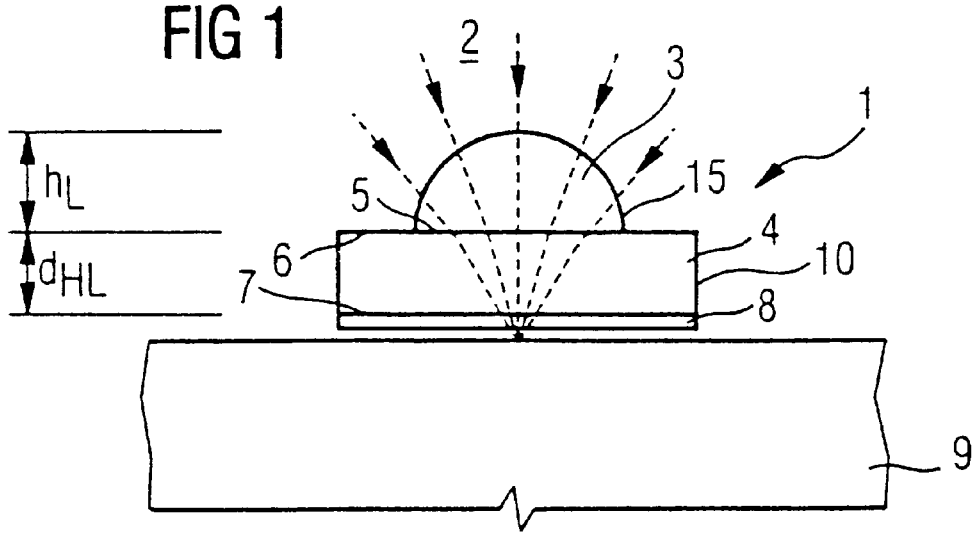
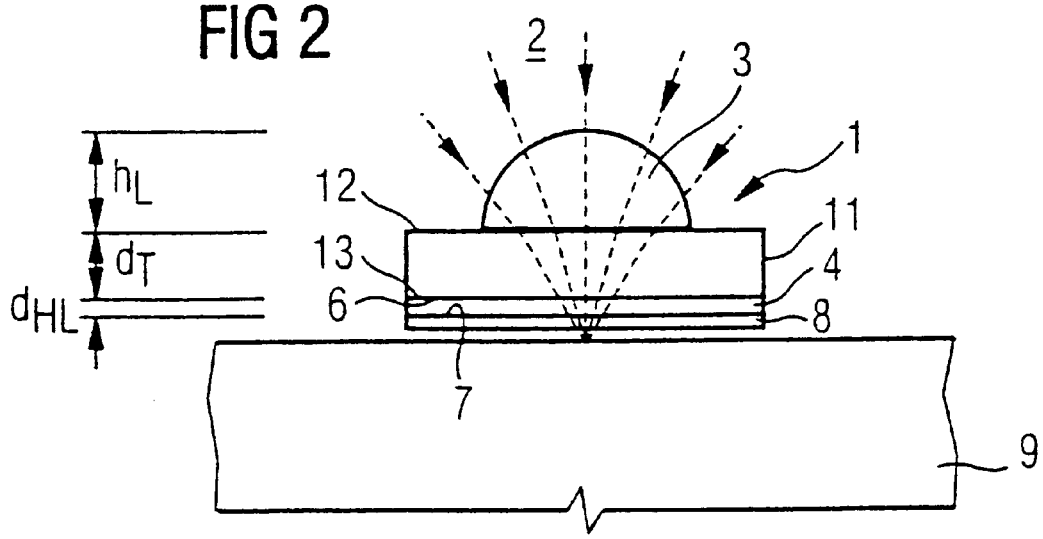

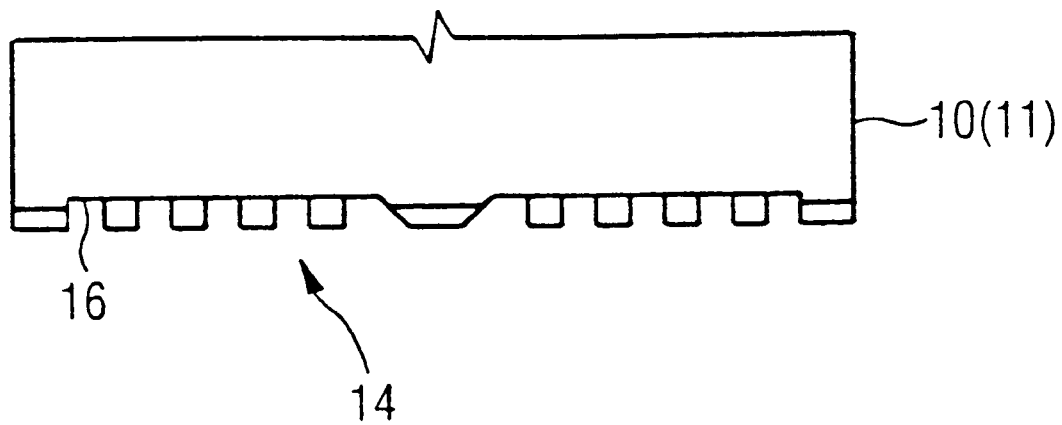
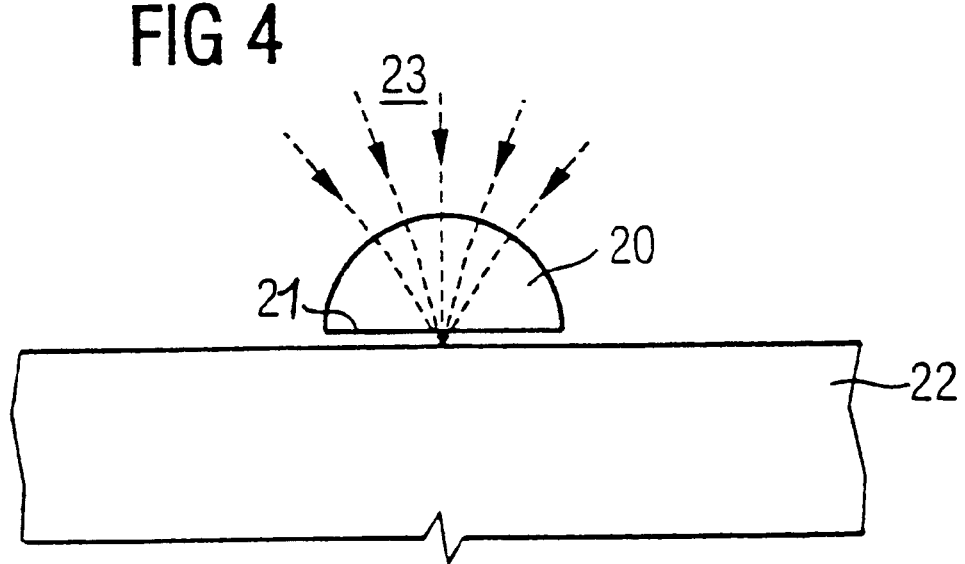

SOLID IMMERSION LENS WITH SEMICONDUCTOR MATERIAL TO ACHIEVE HIGH REFRACTIVE INDEX

BACKGROUND OF THE INVENTION

FIELD OF THE INVENTION

The invention pertains to an immersion system, in particular for a magneto-optical storage device with an immersion lens. More specifically, a lens is provided in the system which is essentially in the shape of a spherical segment with a planar face and a curved face and which is composed of a material that is transparent to electromagnetic radiation of the wavelength λ (the radiation used in the storage device) and which has a first refractive index n, greater than that of air.

In prior art magneto-optical storage devices, such as hard disks, immersion systems are used in the form of a single hemispherical immersion lens. The solid immersion lens is composed, for example, of glass or zirconium oxide and consequently has a refractive index n that is greater than that of air. The electromagnetic radiation which is injected into the immersion lens and which is incident radially into the immersion lens and is concentrated at the center point of the sphere, consequently has the wavelength λ/n within the lens. λ represents the wavelength in air. The planar face of hemispherical immersion lens is, during the operation of the storage device, at such a small distance (for example approximately 50 nm) from the surface of the storage medium that the medium between the immersion lens and the storage medium, generally air, has no physical effect on the radiation with the wavelength λ/n emerging from the immersion lens. For this purpose, this distance is smaller than λ/n6. Consequently, there is physical contact between the immersion lens and the storage medium.

The configuration described above has the effect of ensuring that the radiation, for example monochromatic light of a laser, is transmitted with the wavelength λ/n (=wavelength within the immersion lens) onto the storage medium. The spot of light on the storage medium is consequently reduced in size in comparison with a system without immersion lens in which the spot of light is approximately $(\lambda)^2$ to approximately $(\lambda/n)^2$, giving rise to an increased storage density on the storage medium.

For a given wavelength λ of the electromagnetic radiation, the storage density can thus be influenced by means of the refractive index n of the immersion lens.

In known immersion lenses made of glass (for example quartz glass) or zirconium oxide, the refractive index n lies in the range $1.5 \leq n \leq 2$.

SUMMARY OF THE INVENTION

It is accordingly an object of the invention to provide an immersion system, which overcomes the disadvantages of the heretofore-known devices and methods of this general type and which is further improved with an increased storage density on the storage medium.

With the foregoing and other objects in view there is provided, in accordance with the invention, an immersion system for a magneto-optical storage device operating with electromagnetic radiation of a given wavelength, comprising:

a lens formed in a spherical segment with a planar face and a curved face, the lens being composed of a semiconductor material which is transparent to electromagnetic radiation of the given wavelength and having a first refractive index greater than a refractive index of air.

In accordance with an added feature of the invention, a protective layer is disposed on the planar face of the lens. The material of the protective layer is transparent to the radiation of the given wavelength, it is harder than the semiconductor material, and it is optically inactive.

In accordance with an additional feature of the invention, the semiconductor material is selected from the group consisting of SiC, GaP, Si, Ge, and GaAs.

In other words, in a first solution there is provided a spherical-segment-shaped lens, preferably a hemisphere composed of a semiconductor material, which is transparent to the electromagnetic radiation used in the storage device and has the highest possible refractive index. The material of the lens is selected with reference to the radiation: if radiation of the wavelength λ>400 nm is used, then SiC (n≈2.7), for example, is suitable. For λ≧550 nm, GaP (n≈3.2), for example, is suitable. However, ternary or quaternary III–V or II–VI semiconductor materials are also suitable. Si, Ge or GaAs may also be used for greater wavelengths.

With the above and other objects in view there is also provided, in accordance with the invention, an immersion system for a magneto-optical storage device operating with electromagnetic radiation of a given wavelength, comprising:

a lens formed in a spherical segment with a planar face and a curved face, the lens being transparent to electromagnetic radiation of the given wavelength and having a first refractive index greater than a refractive index of air;

a layer of a material being transparent to the electromagnetic radiation of the given wavelength and having a second refractive index greater than the first refractive index, the layer being disposed downstream of the lens in a direction of propagation of the electromagnetic radiation and having a first main face facing towards the planar face of the lens.

In accordance with an additional feature of the invention, a protective layer disposed on a second main face, the protective layer being transparent to the radiation of the given wavelength, being harder than the layer, and being optically inactive. Preferably, the layer is formed of a semiconductor material.

In accordance with another feature of the invention, the layer is a semiconductor chip, the planar face of the lens resting on the first face of the semiconductor chip, the semiconductor chip having a thickness substantially equal to a product of the second refractive index times a radius of curvature of the curved surface of the lens minus a height thereof.

In accordance with a further feature of the invention, a carrier chip is provided. The carrier chip has a first main face supporting the planar face of the lens and a second main face opposite the first main face. The carrier chip is transparent to the radiation and has a third refractive index, the layer with the second refractive index being disposed on the second main face of the carrier chip and the refractive indices satisfying the following relationship:

$$n_1 \leq n_3 < n_2,$$

where n1 is the first refractive index, n2 is the second refractive index, and n3 is the third refractive index.

In other words, the second solution provides for a layer which is transparent to the electromagnetic radiation and has a higher refractive index to be arranged downstream of the spherical-segment-shaped lens in the direction of propagation of the electromagnetic radiation, such that the planar face of the lens and a first main face of the layer are facing one another. The layer is composed of a semiconductor material with a second refractive index $n_2$ that is greater than the first refractive index of the material of the lens. The aberrations which occur may be eliminated in the objective lens or on the immersion lens by means of corrective layers (for example plastic).

This second solution has the advantage that there is no need for hemispherical lenses made of semiconductor material, which are technically costly to manufacture. Here, the lens used is preferably made of glass, plastic or zirconium oxide, is technically easy to manufacture and thus cost-effective and preferably rests with its planar face on, and is attached to, a semiconductor chip, polished on both sides, or on a carrier chip which is provided on one side with a layer made of a semiconductor material with a higher refractive index, is made of glass or plastic and has a third refractive index $n_3$. The lens has physical contact with the semiconductor chip or with the carrier chip so that the change in the refractive index between the lens and the corresponding chip is as small as possible. The smaller this change in the refractive index, the greater the numerical aperture and consequently the acceptance angle of the system.

Physical contact is generally understood to mean that the distance is smaller than a sixth of the wavelength of the radiation in the corresponding medium.

When a carrier chip made of glass or plastic provided on one side with a layer made of a semiconductor material with a higher refractive index is used, the layer advantageously has a thickness of $\lambda/2$ or of an integral multiple thereof. As a result, adverse effects on the radiation due to resonance are reduced. The layer is applied, for example, by means of epitaxy, vapor deposition, sputtering or the like.

In order to make the main face, facing the storage medium, of the semiconductor chip more resistant to mechanical influences, the latter is preferably provided with a protective layer which is harder than the semiconductor material of the layer with the higher refractive index and which is composed, for example, of SiC, diamond, $Si_3N_4$, $Al_2O_3$ etc. This coating is so thin that it is optically inactive, i.e. that the radiation emerging from the semiconductor layer is not influenced.

The height $h_T$ of the lens and the thickness $d_{HL}$ of the semiconductor chip and/or the thickness of the carrier chip $d_T$ including the thickness $d_{HL}$ of the semiconductor layer with the higher refractive index will together produce the "optical" thickness, i.e. the radius of curvature r of the curved face of the lens. However, the following condition, while not absolutely necessary, is quite advantageous:

$$r = h_L + (d_{HL}/n2)$$

and/or $$r = h_L + (d_T/n_3) + (d_{HL}/n_2).$$

In accordance with again another feature of the invention, the layer with the second refractive index is provided with an inductive device, such as a coil formed in the layer. The inductive device produces a magnetic field for magneto-optical storage. The device, such as coil, is provided on the semiconductor chip or on the carrier chip.

In accordance with a concomitant feature of the invention, at least one photodiode is connected to and supplies power to the inductive device. The diode(s) forms a non-volatile power supply. The diode, which is applied to the semiconductor chip or carrier chip is illuminated, for example, with a laser when the storage device is in operation.

Other features which are considered as characteristic for the invention are set forth in the appended claims.

Although the invention is illustrated and described herein as embodied in an immersion system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic vertical sectional view through a first exemplary embodiment of the invention;

FIG. 2 is a similar view of a second exemplary embodiment;

FIG. 3 is a schematic sectional view of a portion of an immersion system with a coil; and FIG. 4 is a schematic sectional view through a third exemplary embodiment.

DESCRIPTION OF THE PREFERRED EMBODIMENTS

Reference is now had in detail to the figures of the drawing, in which identical and functionally identical components of the various exemplary embodiments are identified with the same reference symbols throughout. First with reference to FIG. 1, there is seen an immersion system 1 with a layer 4 with a higher refractive index. The layer 4 forms a part of a semiconductor chip 10 with a first main face 6 that supports a spherical-segment-shaped lens 3 with its planar face 5. The lens 3 is composed, for example, of glass or plexiglass with a refractive index $n_1$ of approximately 1.5. The semiconductor chip 10, depending on the wavelength $\lambda$ of the electromagnetic radiation 2 incident in the lens 3 through the curved side 15 of said lens 3, is composed of a semiconductor material which is transparent to the wavelength 1 and has a refractive index $n_2$ which is greater than the refractive index n, (see, for example, the above-mentioned semiconductor materials for various wavelength ranges). The lens 3 is attached to the semiconductor chip 10 by means of, for example, adhesive or solder as connecting agent, the thickness of the layer of adhesive or solder between the lens 3 and the semiconductor chip 10 being preferably smaller than 0.1 $\mu$m. The lens 3 and the semiconductor chip 10 being in physical contact, so that the connecting agent between the lens 3 and semiconductor chip 10 is optically inactive. Ideally, the lens 3 rests directly on the semiconductor chip 10.

On a second main face 7 of the semiconductor chip 10 opposite the first main face 6, the chip 10 is provided with a protective layer 8. This is composed, for example, of SiC, diamond, SiN, $Al_2O_3$ or the like and protects the semiconductor 10 against mechanical damage. So that the protective layer 8 is optically inactive with regard to the radiation emerging from the semiconductor chip 10, it has a thickness $\leq \lambda/6$.

The following should be considered in dimensioning the immersion system 1: a thickness $d_{HL}$ of the semiconductor chip 10 divided by the refractive index $n_2$ of the material of the semiconductor chip 10 and the height $h_L$ of the lens 3 together result in the curvature radius r of the curved face 15 of the lens 3. This results in a focal point of the radiation that comes to lie essentially on a storage medium 9 which is disposed on the opposite side of the semiconductor chip 10 in the direction of propagation of the radiation 2. The following equation thus applies:

$$r = h_L + (d_{HL}/n_2).$$

The exemplary embodiment of FIG. 2 differs from the one described above essentially in the fact that the lens 3 is arranged on a first main face 12 of a carrier chip 11 with a thickness $d_t$ and with a third refractive index $n_3$ on whose second main face 13, lying opposite the first main face 12, a semiconductor layer 4 with a second refractive index $n_2$ is applied. For the refractive indices the following applies: $n_1 \leq n_3 < n_2$. The semiconductor layer 4 has a thickness $d_{HL}$ of $\lambda/2$ or an integral multiple of $\lambda/2$. In terms of the thicknesses of the individual components of the immersion system the following equation applies:

$$r = h_L + (d_t/n_3) + (d_{HL}/n_2).$$

The semiconductor layer 4 is applied to the carrier chip 11 epitaxially or by means of sputtering, for example, said carrier chip 11 being composed, for example, of the same material as the lens 3. For the sake of mechanical protection it may be provided with a protective layer 8.

The embodiment in FIG. 3 corresponds essentially to one of the two previously mentioned exemplary embodiments. Here, an annular recess 16, in which a coil 14 for producing a magnetic field for magnetic storage is arranged, is merely provided on the second main face 7 or 13 of the semiconductor chip 10 or of the carrier chip 11. The coil 14 is composed, for example, of a vapor-deposited metal layer which is structured photolithographically. The current for producing the magnetic field in the coil 16 can be made available in a non-volatile fashion by means of, for example, one or more GaAs photodiodes which are applied to the semiconductor chip 10 or the carrier chip 11. The diodes may be illuminated, for example, with a laser while the storage device is in operation.

In the immersion system in FIG. 4, the entire hemispherical lens 10 is composed of a semiconductor material which is transparent to the electromagnetic radiation used in the storage device. Depending on the wavelength $\lambda$, the semiconductor material is, preferably, selected from the group SiC, GaP, Si, Ge, GaAs.

The planar face 21 of the hemispherical lens 20 may be provided with a protective layer that is transparent to radiation 23 of the wavelength $\lambda$, that is harder than the semiconductor material, and that is optically inactive (cf. the exemplary embodiments illustrated in conjunction with FIGS. 1 and 2).

The planar face 21 of the immersion lens 20 is, when the storage device is in operation, at such a small distance from the surface of the storage medium 22 (for example approximately 50 nm), that the medium between the immersion lens 20 and storage medium 22, generally air, is physically without effect on the radiation which emerges from the immersion lens 20 and has the wavelength $\lambda/n$. For this purpose, this distance is smaller than $\lambda/n6$. Consequently, there is physical contact between the immersion lens 20 and the storage medium 22.

In this exemplary embodiment too, an annular recess 16 in which a coil 14 for producing a magnetic field for magnetic storage is arranged may also be provided on the planar face 21, similarly to the embodiment in FIG. 3.

I claim:

1. An immersion system for a magneto-optical storage device operating with electromagnetic radiation of a given wavelength, comprising:

a lens formed in a spherical segment with a planar face and a curved face, said lens being transparent to electromagnetic radiation of the given wavelength and having a first refractive index greater than a refractive index of air;

a layer of a material being transparent to the electromagnetic radiation of the given wavelength and having a second refractive index greater than the first refractive index, said layer being disposed downstream of said lens in a direction of propagation of the electromagnetic radiation and having a first main face facing towards said planar face of said lens.

2. The immersion system according to claim 1, wherein said layer with the second refractive index is provided with an inductive device.

3. The immersion system according to claim 2, wherein said inductive device is a coil formed in said layer.

4. The immersion system according to claim 2, which further comprises at least one photodiode connected to and supplying power to said inductive device.

5. The immersion system according to claim 1, wherein said layer is composed of a semiconductor material that is transparent to the radiation of the given wavelength.

6. The immersion system according to claim 5, wherein said semiconductor material is selected from the group consisting of SiC, GaP, Si, Ge, and GaAs, depending on the given wavelength.

7. The immersion system according to claim 1, wherein said layer has second main face opposite said first main face, and including a protective layer disposed on said second main face, said protective layer being transparent to the radiation of the given wavelength, being harder than said layer, and being optically inactive.

8. The immersion system according to claim 7, wherein said layer is formed of a semiconductor material.

9. The immersion system according to claim 1, wherein said layer is a semiconductor chip, said planar face of said lens resting on said first face of said semiconductor chip, said semiconductor chip having a thickness substantially equal to a product of the second refractive index times a radius of curvature of the curved surface of said lens minus a height thereof.

10. The immersion system according to claim 1, which further comprises a carrier chip having a first main face supporting said planar face of said lens and a second main face opposite said first main face, said carrier chip being transparent to the radiation and having a third refractive index, said layer with the second refractive index being disposed on said second main face of said carrier chip and the refractive indices satisfying the following relationship:

$$n_1 \leq n_3 < n_2,$$

where n1 is the first refractive index, n2 is the second refractive index, and n3 is the third refractive index.

* * * * *